June 13, 1950 H. C. CHAMBERLIN 2,511,246
APPARATUS FOR HANDLING BULK INSULATING MATERIAL
Filed March 14, 1947 6 Sheets-Sheet 1

INVENTOR.
HARRY C. CHAMBERLIN
BY Paul, Paul & Moore
ATTORNEYS

INVENTOR.
HARRY C. CHAMBERLIN

Patented June 13, 1950

2,511,246

UNITED STATES PATENT OFFICE 2,511,246

APPARATUS FOR HANDLING BULK INSULATING MATERIAL

Harry C. Chamberlin, La Crosse, Wis.

Application March 14, 1947, Serial No. 734,782

11 Claims. (Cl. 214—83.18)

This invention relates to new and useful improvements in apparatus for handling bulk material, and more particularly to such an apparatus adapted for transporting and blowing insulating material, such as mineral or rock wool, into wall spaces and other places to be insulated.

Mineral or rock wool in granular form is now extensively used as an insulating medium in building construction, and particularly in older buildings which require insulation, because it may readily be blown into the spaces in old walls and into other remote places by suitable equipment developed for that purpose.

Heretofore, it has been common practice to transport the rock wool or other insulating material from the source of supply to the building or job where it is to be used in an automotive truck, the insulating material being contained in large paper bags to facilitate handing. To thus bag the insulating material to facilitate transporting it from the source of supply to the consumer, or from one place to another, greatly adds to the cost of handling the insulating material as it requires labor to fill the bags, and also to load the filled bags onto trucks or into railroad cars, and again to unload the bags from the trucks or railroad cars.

It will thus be noted that with the method now commonly employed for handling insulating material to be blown into building walls, the filled bags frequently must be manually handled several times before they reach their destination from the source of supply. In addition to the labor required to thus handle the insulating material, valuable carrying space is lost as a result of the voids or empty spaces occurring between the bags when the latter are piled or loaded into a truck or box car. Then, too, the weight of the paper bags in which the insulating material is being transported materially reduces the weight of the pay load, because the weight of the empty bags, per se, in a carload of filled bags may amount to approximately four hundred pounds. Thus, the weight of the bags, independently of their contents, will reduce the weight of the pay load of the truck. In addition, a considerable saving is effected by eliminating the cost of the bags.

The present invention is directed primarily to an apparatus for handling bulk material such as rock wool and other similar materials, whereby the material may be handled in bulk form from the source of supply until delivered on the job and blown into wall spaces or other places where it is to be used.

An object of the invention, therefore, is to provide an improved apparatus for thus handling granular bulk rock wool and similar materials whereby the operation of handling the material at the source of supply and all along the line until eventually blown into a wall or other place on the job, may be accomplished with a minimum of labor and in considerable less time than has heretofore been possible with well known methods and apparatus now in use.

A further object is to provide in combination with a conventional automotive truck, a body whose walls define a container for receiving rock wool in bulk form and in which it is hauled from the source of supply to the job, and an unloading device being provided in the truck body or container, above the space occupied by the material contained therein, whereby the unloading device may be lowered into direct contact with the material and so operated as to gradually feed the material from the top of the load and discharge it from the rear end of the container in a highly aerated and fluffy state, into a feeder or blower for blowing the material into the spaces of a building wall or into an attic, or other remote place.

A further object is to provide an apparatus of the class described comprising a container for receiving granular bulk rock wool, said container having a horizontal conveyer therein, the width and length of which are substantially equal to the width and length of the container, and means being provided for vertically translating the conveyer in the truck body or container whereby the conveyer may be elevated to a position adjacent the top wall of the container, when the latter is being filled with insulating material from a suitable storage bin or box car, after which the conveyer may be lowered into direct contact with the top of the load and operated to discharge the material from the top of the load into one or more suitable feeders provided at the rear of the truck body for receiving the rock wool from the conveyer, said feeders being provided with suitable flexible service hoses or conduits for conducting the insulating material from the feeders to the wall spaces or other places into which it is to be blown by air pressure.

A further object is to provide an improved apparatus for handling granular bulk rock or mineral wool whereby such material to be blown into a wall space or other remote place may be handled entirely in bulk form, including the hauling or transporting of the material to the job, and the subsequent blowing of the material into the wall spaces to be filled therewith.

A further and more specific object is to provide an apparatus for handling rock wool in granular bulk form comprising a container for receiving the rock wool and in which the rock wool is transported from the source of supply to the job, and one or more feeders being mounted on the rear and underneath the truck body, and means being provided within the container for unloading the material from the container and delivering it to said feeders, and suitable safety devices being provided in conjunction with said feeders for automatically reducing the rate of discharge of the material from the truck thereto, in the event the service lines or hose become momentarily clogged, or partially so.

A further object is to provide in combination with a conventional truck chassis a suitable body whose walls define a container for receiving bulk rock wool, and a horizontally disposed conveyer being mounted within the container and suspended from the upper portion thereof above the material and having a driving connection with a suitable motor whereby said horizontal conveyer may be operated to discharge the rock wool from the top of the load into a chute adjacent to the rear end of the container, and the lower end of which communicates with one or more pneumatically operated feeders operated independently of the horizontal conveyer and provided with overload safety devices, whereby should one or more of the feeders momentarily become overloaded, said overload devices will automatically effect a reduction in the speed of the drive motor for the elevator without effecting the operation of the pneumatic feeders, whereby the feeding rate of the material to the feeders is automatically reduced to thereby permit the obstruction in the service lines or hose to be quickly eliminated, usually without having to interrupt the operation of the feeders.

A further object is to provide an apparatus of the class described comprising a container for transporting bulk insulating material from a source of supply to the job, and a horizontally disposed conveyer being mounted within the container and having means for vertically translating it in said container, the conveyer being so arranged within the container or truck body as to permit convenient loading thereof, said conveyer being adapted to be lowered into direct contact with the top of the load whereby the load may be discharged from the container into a chute at the rear of the container or truck body, which chute directs the material to one or more pneumatically operated feeders each provided with a hose line for conducting the insulating material, under air pressure, from the feeders into wall spaces or other remote places, and electrical means being provided for automatically causing the conveyer to come to rest, when it reaches the limit of its upward travel, and in which position of the conveyer, the container may readily be loaded; and similar means being provided for automatically interrupting the downward travel of the conveyer when the material has been unloaded from the container.

A further object of the invention, therefore, is to provide an apparatus of the class described, provided with manual and automatic controls whereby its operation may readily be controlled by a single operator.

Other objects of the invention reside in the unique mounting of the horizontal conveyer in the container or truck body; in the construction of the rear wall of the container which consists of a plurality of telescoping plates or gates which are operatively connected to the conveyer and are movable thereby, as the conveyer is vertically translated within the container or truck body; in the unique arrangement of the drive for the conveyer whereby the operation of elevating the conveyer to its uppermost position may be quickly accomplished, when the load has been discharged from the container; in the provision of upper and lower limit switches for limiting the up and down travel of the horizontal conveyer, and whereby the circuit to the drive motor for the conveyer is automatically opened whenever the conveyer reaches its limits of travel in either direction; and in the unique construction of the feeders which may be driven from a source of power carried by the truck, each feeder being provided with a pneumatically operated safety device for automatically closing or partially closing the gates provided in the legs directing the insulating material into the feeders from the chute at the rear of the container, whereby should the service line or hose of one or both of the feeders become temporarily partially clogged, and cause a back pressure to develop in the feeder, said back pressure will actuate the safety device of the momentarily clogged feeder and thereby effect the automatic closing of its gate, whereby the flow of material to said feeder is automatically cut off or temporarily interrupted, and without interrupting the supply of air to the feeder service hose, whereby the pressure in the service hose may automatically clear the hose of its obstruction without interrupting the operation of the entire apparatus; in the provision and arrangement of the electric control means for the horizontal conveyer, which includes a manually operable starter switch, and suitable limit switches for automatically stopping the traveling movement of the conveyer, when it reaches the limit of its travel in either direction independently of the operator, and electrically operable means made operable by the pneumatically operated safety devices of the feeders for automatically interposing a resistance in the conveyer drive motor circuit to thereby reduce the speed of said motor and therefore the feeding rate of the conveyer; and in the simple and inexpensive construction of the apparatus, as a whole, whereby it readily lends itself to manufacture in quantity production at low cost.

Other objects of the invention will appear from the following description and the accompanying drawings and will be pointed out in the annexed claims.

In the accompanying drawings there has been disclosed a structure designed to carry out the various objects of the invention, but it is to be understood that the invention is not confined to the exact features shown, as various changes may be made within the scope of the claims which follow.

Figure 1:
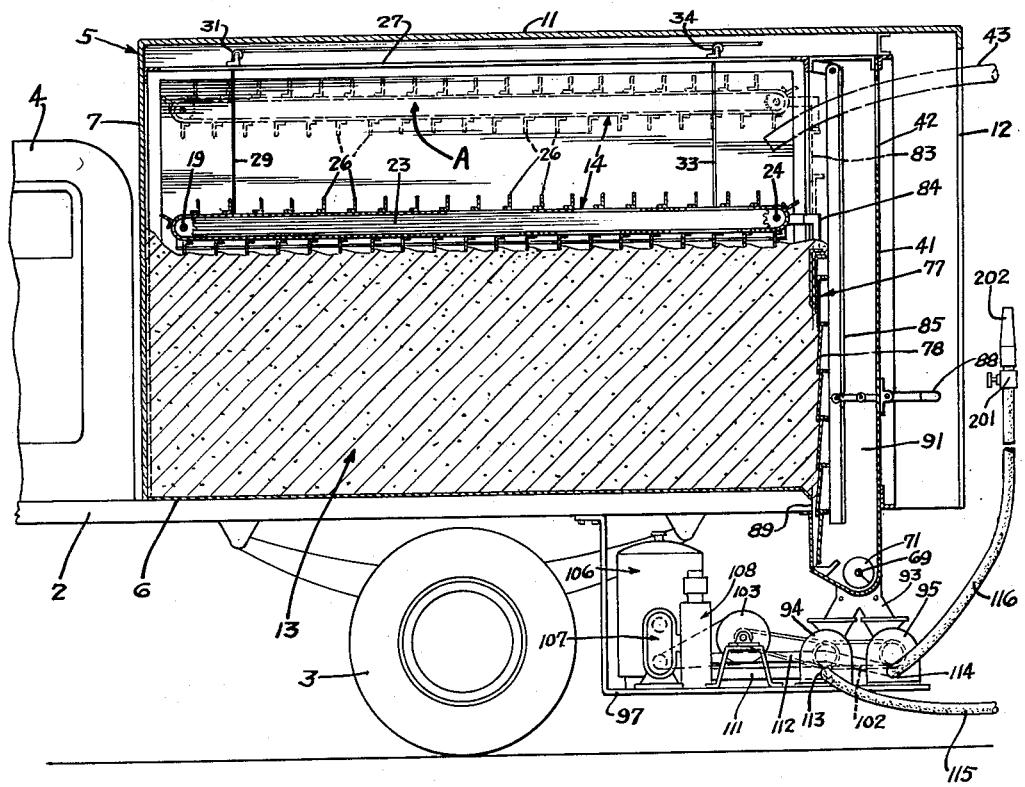
Figure 1 is a vertical sectional view through the apparatus showing it mounted on a conventional truck body, the telescoping plates or sections of the rear wall of the container being shown in their forward positions.

In the selected embodiment of the invention herein disclosed, there is illustrated in Figure 1, a portion of a conventional automotive truck including the usual chassis 2, rear wheels 3, and cab 4. Mounted on the chassis back of the cab 4 is a load-carrying body, generally indicated by the numeral 5, which comprises a bottom wall 6, front wall 7, side walls 8 and 9, and a top wall 11. The rear end of the body 5 may be open as shown at 12, but may be closed by provision of a suitable closure not shown, if so desired. The walls 6, 7, 8, 9 and 11 of said body, cooperate to provide a container for receiving granular bulk material such as mineral or rock wool, indicated at 13 in Figures 1 and 3 of the drawings.

Figure 3:
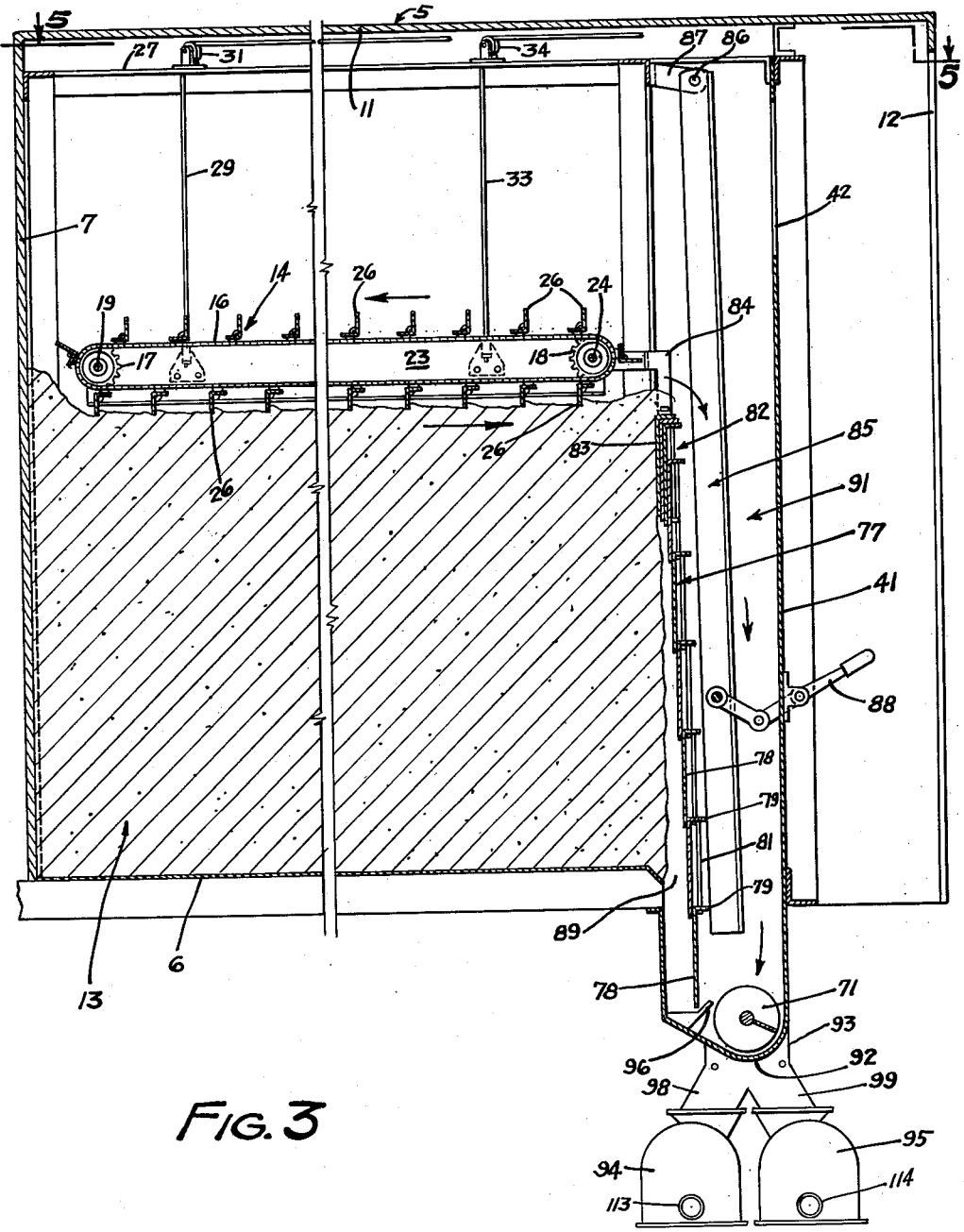
Figure 3 is a view similar to Figure 1, on a larger scale, showing the telescoping plates or sections of the rear container wall in the positions assumed when discharging rock wool from the apparatus.
Figure 5:
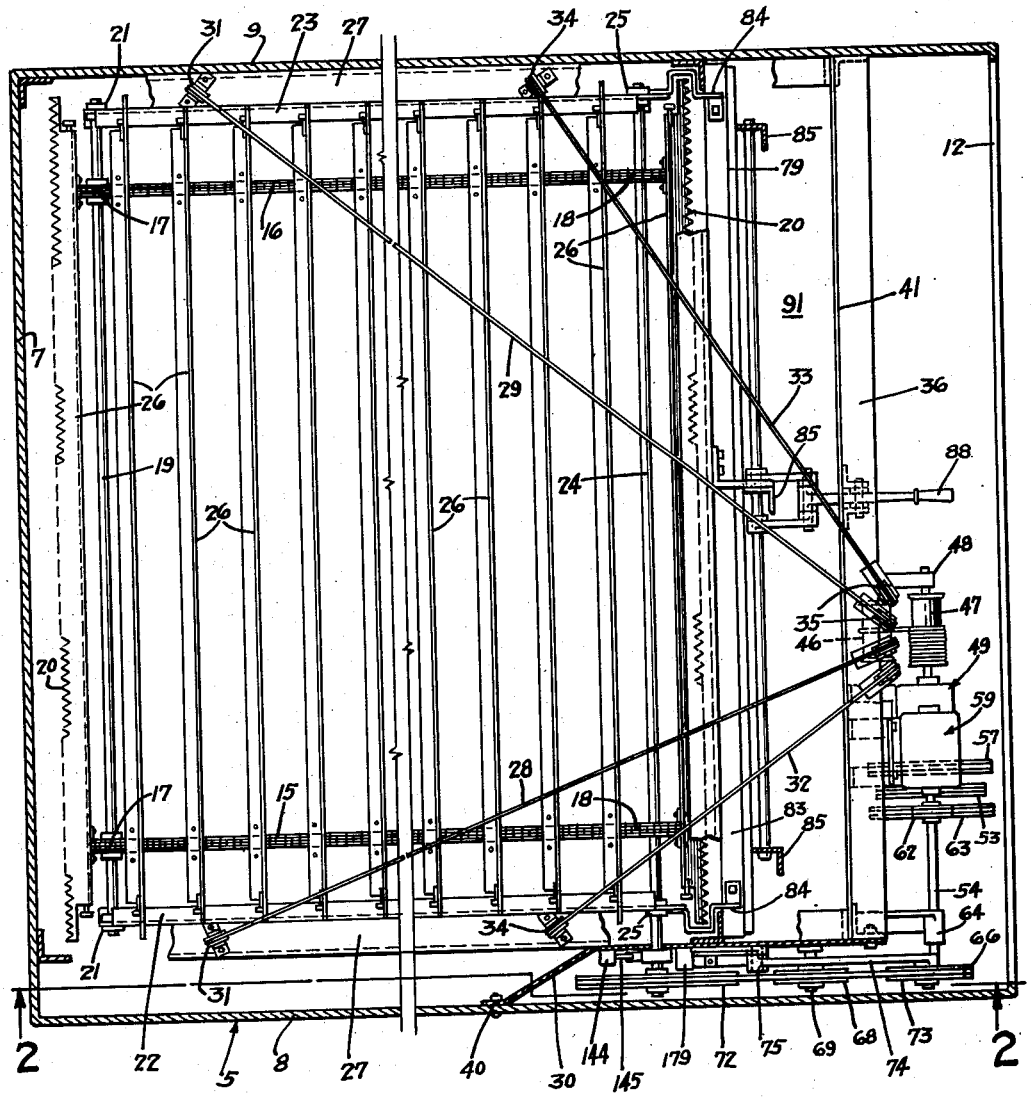
Figure 5 is a detail sectional view substantially on the line 5—5 of Figure 3.

An important feature of the present invention resides in the provision of a horizontally disposed conveyer within the container or truck body for unloading the bulk material therefrom. This conveyer, generally designated by the numeral 14, is best shown in Figures 1, 3 and 5 and comprises a pair of spaced endless chains 15 and 16 having running connections with sprockets 17 and 18 provided, respectively, at the front and rear of the container. The sprockets 17 are secured to a shaft 19 rotatably supported in suitable bearings 21 provided in spaced channel-like side members 22 and 23 which constitute the supporting frame of the conveyer.

The sprockets 18 at the rear end of the conveyer are secured to a cross shaft 24 mounted in suitable bearings 25 secured to the rear ends of the side frame members 22 and 23 of the conveyer. Thus the shafts 19 and 24 cooperate with the side frame members 22 and 23 to complete the formation of the conveyer frame.

Figure 4:
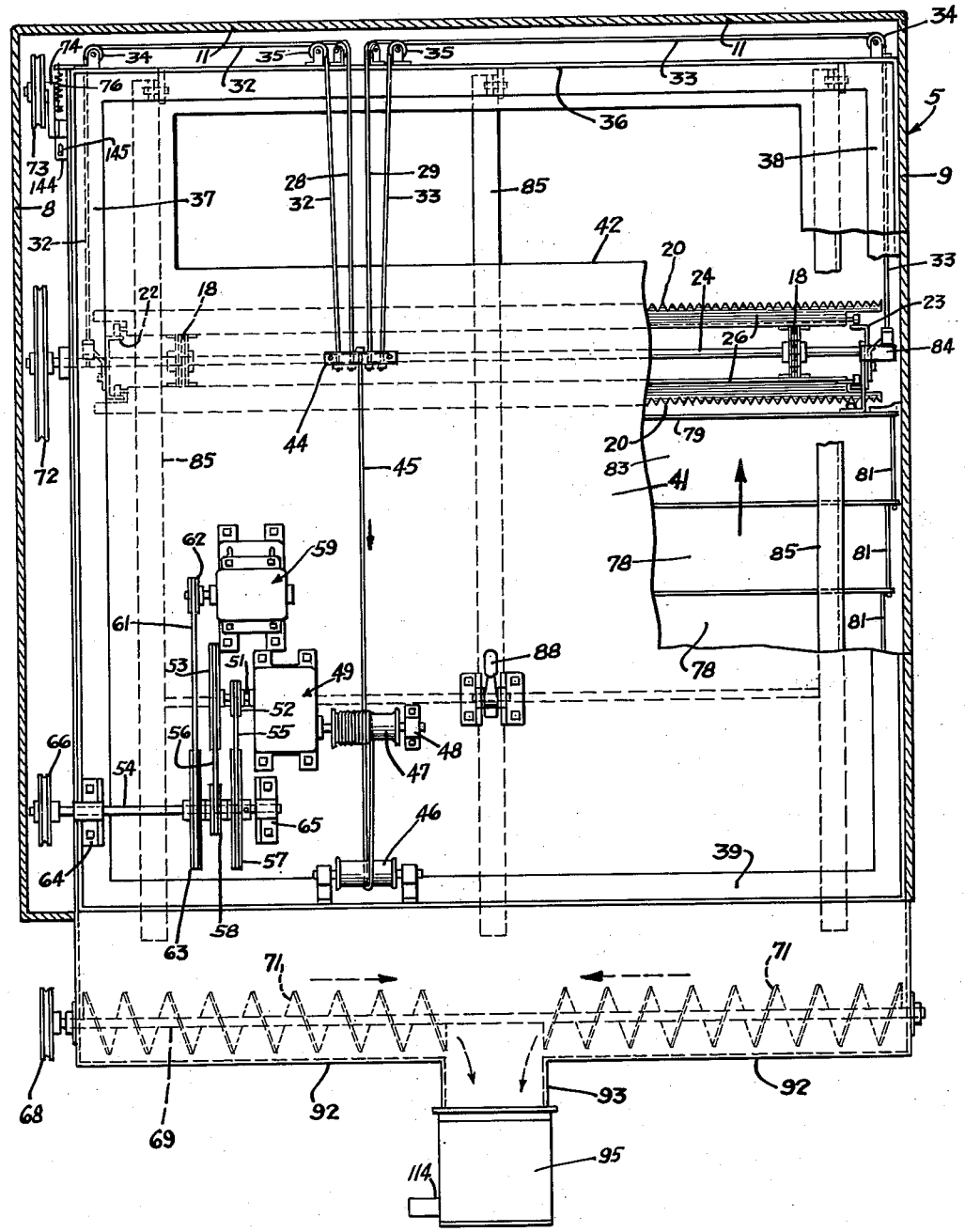
Figure 4 is a detail sectional view substantially on the line 4—4 of Figure 2, showing the means for driving the conveyer.

A plurality of angle-like slats 26 are secured to the chains 15 and 16, in spaced relation, as clearly illustrated in Figures 3 and 5. These slats have serrated or tooth-like edges 20 adapted to engage the insulating material in the container, when the conveyer is lowered into direct contact therewith, as shown in Figures 1 and 3. The forward end of the conveyer is shown suspended from an overhead support 27 by suitable cables 28 and 29 having running connections with sheaves 31 supported in brackets secured to the support 27. The rear end portion of the conveyer is similarly suspended by suitable cables 32 and 33 having running connections with sheaves 34 mounted in suitable brackets secured to the support 27. From the sheaves 31 and 34, the cables pass over a plurality of guide sheaves 35 mounted on a frame member 36 having its end portions secured to upright frame members 37 and 38, as best shown in Figure 4. The lower ends of the frame members 37 and 38 may be secured to a suitable cross member 39.

Secured to the frame members 36 to 39, inclusive, is a suitable plate 41 having a filler opening 42 therein adjacent to its upper end to facilitate loading the container or body by inserting a filler hose through said opening, as indicated by the dotted lines 43 in Figure 1. Thus the frame members 36 to 39, inclusive, and the plate 41 cooperate to provide a suitable supporting structure for the rear end of the truck body for supporting the driving means for the conveyer, which will subsequently be described.

From the idler sheaves 35, the cables 32, 28, 29, and 33 extend downwardly and have their lower ends secured to a suitable connecting block of member 44 having one end of an operating cable 45 secured thereto which passes downwardly around an idler drum 46 and has its opposite end coiled about and secured to a winding drum 47, one end of which is shown supported in a bracket 48 and the opposite end of which is operatively connected to a suitable speed reducer 49. The speed reducer 49 is shown provided with a shaft 51 upon which pulleys 52 and 53 are mounted. The speed reducer 49 is shown driven from a countershaft 54 through one or the other of a pair of belts 55 and 56, as will subsequently be described.

The belt 55 provides a driving connection between the pulley 52 of the speed reducer and a relatively larger pulley 57 secured to the countershaft 54, and the belt 56 provides a driving connection between the relatively larger pulley 53 of the speed reducer and a smaller pulley 58, also secured to the countershaft 54. The countershaft is driven from a motor 59 through a belt 61 having driving connections with the motor pulley 62 and a pulley 63 secured to the countershaft 54. The speed reducer 49 and motor 59 are shown mounted directly upon the rear plate 41, and the countershaft 54 is shown supported in bearings 64 and 65 secured to the frame structure provided by the frame members 27 and plate 41.

Secured to the outer end of the countershaft 54 is a pulley 66 having a belt 67 engaged therewith which also has running connections with a pulley 68 secured to one end of a shaft 69 of a suitable screw type conveyer 71, best shown in Figure 4. From the pulley 68 the belt 67 extends upwardly and has a running connection with a pulley 72 secured to one end of the cross shaft 24 of the horizontal conveyer 14, as perhaps best illustrated in Figure 5. The belt 67 also has a running connection with a pulley 73 supported on an arm 74 mounted for pivotal movement upon a pivot 75. A suitable spring 76 has one end secured to the arm 74 and its opposite end to a fixed part of the frame, whereby the spring constantly exerts an upward pull on the arm 74 to maintain the belt 67 under tension during the up and down travel of the horizontal conveyer 14.

To prevent the insulating material in the container from coming in contact with the driving means for the conveyer 14, the pulleys 66, 68, 72 and 73 are mounted between the side wall 8 and an inner wall member or plate 30 having its forward edge secured to the wall 8, as shown at 40 in Figure 5, and having its intermediate and rear portions spaced inwardly from the side wall 8, thereby to provide a space between it and the rear portion of the side wall 8 in which to house the pulleys 66, 68, 72 and 73, and the belt 67. A vertically disposed slot or opening 50 is shown provided in the plate 30 to allow for the vertical travel of the shaft 24 of the horizontal conveyer 14. See Figure 2.

Another important feature of the invention resides in the unique construction of the rear wall of the container, generally designated by the numeral 77. As best shown in Figure 3, the rear wall 77 is composed of a plurality of telescoping plate sections 78, each provided with an upper horizontally disposed flange 79. The plates 78 are interconnected by a plurality of rods 81 whereby they may telescope, as indicated for example, at 82 in Figure 3, as the conveyer gradually descends in the operation of unloading the material from the container.

To support the rear wall 77 of the container, the uppermost telescoping plate section 83 thereof is shown having its end portions fixedly secured to the side frame members 22 and 23 of the conveyer 14 by suitable opposed brackets 84, whereby the upper telescoping plate 83 will move up and down directly with the conveyer 14, as will be understood. Thus the rear wall sections 78 are telescopically supported, one from the other by the rods 81. The upper telescoping plate 83 also provides a substantial tie between the side frame members 22 and 23 of the supporting frame of the conveyer 14.

The composite wall formed by the telescoping plates 78 and 83 is mounted for limited swinging movement, as will be noted by reference to Figures 1 and 3. A plurality of pressure bars 85 are supported from suitable pivots 86 mounted in brackets 87 secured to the upper portion of the supporting frame of the struture, as best shown in Figure 3. A lever 88 is pivotally mounted on the plate 41 and has operative connections with the upright bars 85 whereby when the lever is swung downwardly to the position shown in dotted lines in Figure 2, the telescoping plate sections 78 will be swung forwardly to close the gap 89, which may be provided between the mass of insulating material in the container and the plate sections 78, when the latter are swung outwardly to the full line position shown in Figure 3. When so positioned, the plates 78 may readily telescope as the conveyer gradually descends in the operation of unloading the material from the container.

The plate 41, it will be noted by reference to Figure 3 is shown spaced outwardly from the rear sectional wall 77 of the container thereby to provide a chute 91 into which the material is discharged from the top of the load by the conveyer 14, when the latter is in operation. During the unloading of the material from the container, the rear wall 77 of the container is preferably in the position shown in Figure 3, but not necessarily so. The characteristics of rock wool are usually such that it does not readily flow into a small space whereby when the wall 77 is swung outwardly as shown in Figure 3, a gap is provided between it and the adjacent surface of the insulating material. The lower end of the chute 91 terminates in a bottom wall 92 having a discharge spout 93 leading therefrom to a pair of feeders 94 and 95, shown in Figures 2 and 3.

The screw type conveyer 71, previously referred to, is mounted in the bottom of the chute 91 and comprises opposed sections whereby the spiral vanes at the two conveyer sections will simultaneously feed the insulating material in an inward direction towards the discharge spout 93, as indicated by the arrows in Figure 4. A suitable stop 96 is shown provided at the lower end of the chute 91 for limiting the inward swinging movement of the plates 78 of the rear wall 77. The feeders 94 and 95 are shown supported upon a platform suspended from the chassis frame 2 of the truck, as clearly illustrated in Figure 2.

Figure 2:
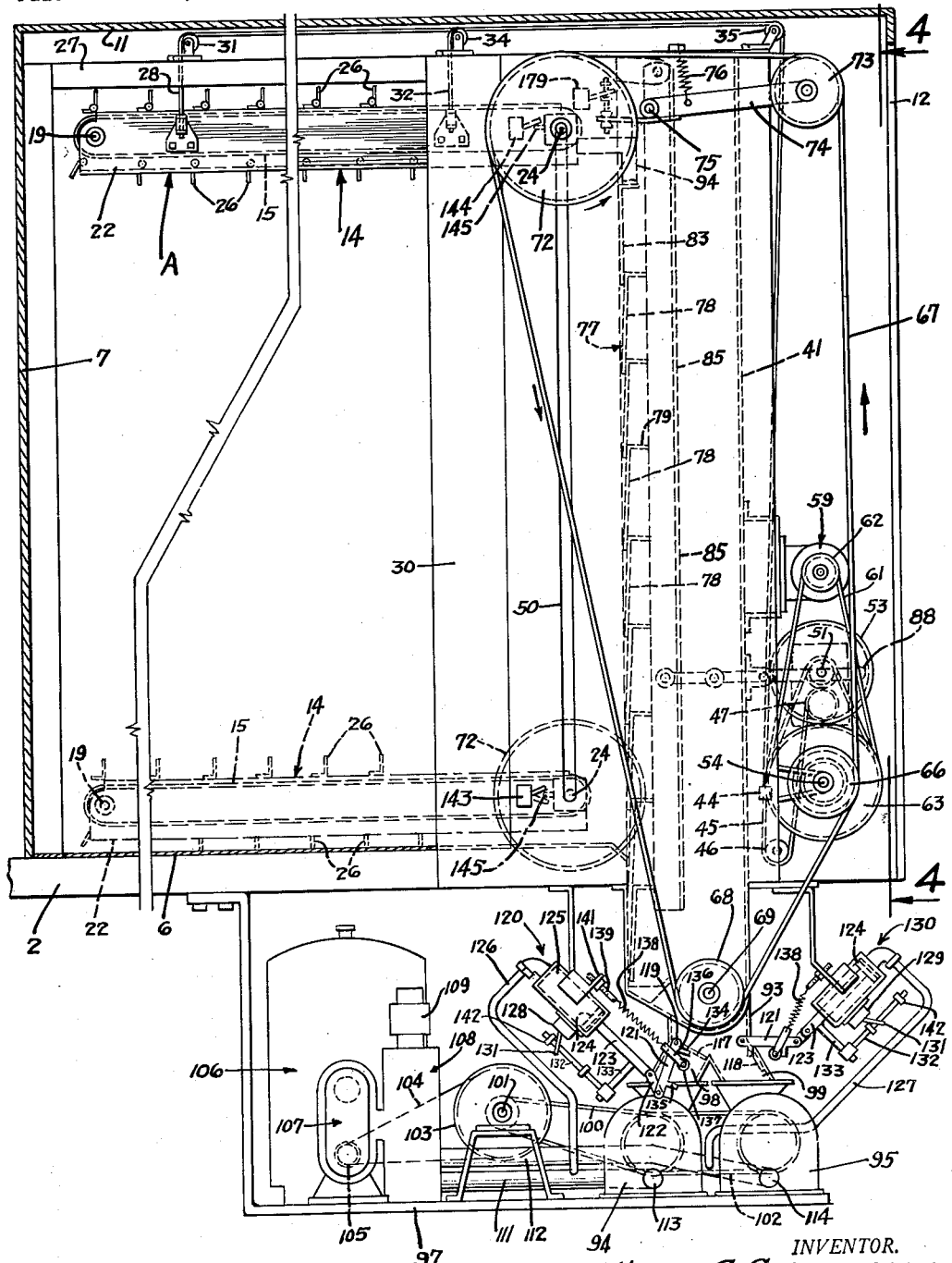
Figure 2 is an enlarged detail sectional view substantially on the line 2—2 of Figure 5, showing the pneumatic feeders and the pressure actuated means for automatically shutting off the supply of material to the feeders, should the service lines therefrom become momentarily clogged, or partially so.

The discharge spout 93 connecting the conveyer 71 with the feeders 94 and 95 is split or divided to provide angularly disposed legs 98 and 99 leading respectively to the feeders 94 and 95, as best indicated in Figure 2. The feeders 94 and 95 may be of conventional construction and therefore need not be described in further detail. The feeder 94 is shown driven from a countershaft 101 by a flexible drive 100, and the feeder 95 is shown driven from the feeder 94 by a belt drive 102. Thus the feeders operate simultaneously when the apparatus is in operation. The countershaft 101 is shown having a pulley 103 secured thereto which has a belt 104 connecting it to a pulley 105 provided on a suitable prime mover or power device, such as an internal combustion engine, generally indicated by the numeral 106.

The engine 106 may also drive a compressor or air pump, indicated by the numeral 107. The blower or compressor 107 may be arranged to deliver air into a receiving tank, generally indicated by the numeral 108, shown provided with a suitable pressure relief valve 109. The tank 108 has a conduit 111 connecting it with the feeder 94, and a similar conduit 112 delivers air to the feeder 95 from the tank 108. The tank 108 serves as an expansion tank to equalize the air pressure in the conduits 111 and 112 connecting it to the feeders 94 and 95.

The usual feeders 94 and 95 are shown provided with connections 113 and 114 to which the usual service hose or lines 115 and 116 may be connected, as shown in Figure 1. The hose or service lines 115 and 116 conduct the insulating material from the feeders to the wall spaces or other places to be insulated, by air pressure, as is well known in the art.

Another important feature of the present invention resides in the means provided for preventing overloading of the feeders 94 and 95, which may occur at times should the usual hoses and nozzles provided at the ends of the service hose or lines become clogged, as when delivering insulating material into wall spaces which may be about filled. To thus prevent overloading of the feeders, means is provided for automatically reducing the flow of insulating material to one or both feeders in the event that an obstruction occurs in one or both of the service hose 115 and 116.

To thus interrupt the supply of insulating material to the feeders, gates 117 and 118 are provided respectively in the legs 98 and 99 of the spout 93. These gates are normally retained in open positions and are closed automatically by back pressure which may develop in their respective feeders in the event that the service hose from one or both of the feeders become partially clogged.

The gate 117 of feeder 94 is shown secured to a shaft 119 mounted for rocking movement in the walls of the leg 98. An arm 121 is secured to the shaft 119 exteriorly of the leg 98 and is shown having a link 122 connecting the free end thereof to a piston rod 123 of a piston 124 mounted for reciprocal movement within a suitable air cylinder 125. A conduit 126 has one end connected with the upper end of the cylinder 125 and its lower end is in communication with the air conduit 111 which supplies air under pressure to the feeder 94. The operating mechanism for gate 118 of feeder 95 is constructed in a manner substantially similar to the operating mechanism of feeder 94, and the parts thereof will therefore be referred to by like numerals.

However, to simplify the description of the operation of the apparatus, the cylinders 125 of the feeders 94 and 95, and their associated parts will hereinafter be referred to as pneumatic gate control devices 120 and 130, respectively. The cylinder 125 of feeder 95 has one end of a conduit 127 connected thereto, the opposite end of which is connected to the air conduit 112 connecting the feeder 95 with the pressure tank 108.

By thus inter-connecting the cylinder 125 with the air supply conduits 111 and 112 of the feeders 94 and 95, when one or both of the service hose or lines 115 and 116 become overloaded, or partially clogged, the back pressure which may develop in the feeder of the partially clogged hose will actuate its piston 124 and move it downwardly in a direction to close the control gate in the leg of the clogged or overloaded feeder, as shown for example, at the left-hand side of Figure 2. In this figure it will be noted that the piston 124 of the gate 117 of the pneumatic control device 120 has been forced downwardly into closed position, whereas gate 118 of the other control device 130 is in wide open position.

For example, should the service line 115 of feeder 94 begin to clog or become overloaded, then the gate 117 of said feeder will gradually move towards its closing position until the switch 128 is eventually opened, whereupon a resistance is interposed in the circuit of the motor 59 which will reduce the speed of the motor and therefore the speed of the conveyer 14, as will subsequently be described. Such reduction in the speed of the conveyer will be sufficient to reduce the delivery of insulating material to the overloaded feeder so that its service line 115 may be quickly cleared of the obstruction as a result of the constant air pressure delivered to the feeder from the pressure tank 108, regardless of the rate of feed of the material to the feeder.

To thus automatically reduce the speed of the horizontal conveyer 14 in the event of an overload or partial clogging of one of the service lines, a pair of control switches, generally designated by the numerals 128 and 129 are mounted on the cylinders 125 of the pneumatic control devices 120 and 130, respectively, as shown in Figure 2. These switches are of well known construction and therefore need not be described in detail. Each comprises a control lever or element 131, shown having an operative connection with a piston rod 132 secured to a post 133 mounted on the piston rods 123 of the pistons 124 of the two control devices. The switches 128 and 129 are adapted to be opened and closed by the actuation of the control elements 131 thereof, as will next be described.

As shown in this Figure 2, each switch operating rod 132 is provided with spaced abutments 134 and 135, and a suitable clevis or yoke 136 has its spaced legs straddling the arm 121 and connected together by a suitable pin having an anti-friction roller 137 mounted thereon which travels back and forth on the adjacent edge of the arm 121, giving a snap action. When the parts are operated, a suitable spring 138 has one end connected to the clevis 136 and its opposite end to a rod or screw 139, adjustably mounted in a bracket 141.

The parts 121, 122 and 123 of each pneumatic control device 120 or 130, are so interconnected that when said parts are in their normal gate-opening positions, as shown with respect to control device 130 in Figure 2, the link 122 will be substantially axially aligned with the piston rod 123. When, however, a back pressure develops, say in the feeder 94, such back pressure is transferred to the cylinder 125 of control unit 120 and thereby causes its piston 124 to move forwardly against the tension of the spring 138. The initial movement of the piston rod 123 will have no effect upon the switch 131 because of the abutment 142 of the rod 132 being initially spaced from the switch operating element 131.

By referring to the pneumatic control devices 120 and 130 in Figure 2, it will be noted that when the pistons 124 are in their normal inoperative positions, the clevis 136 engaged with the arms 121 will be positioned adjacent to the lugs or abutments 135 at the outer ends of the arms 121, whereby the springs will exert their maximum pull on said arms.

When one of the feeders as, for example, feeder 94 begins to clog or becomes overloaded, the back pressure developing in said feeder will cause its piston 124 to move forwardly, and when the arm 121 reaches a certain position in the forward travel of the piston, the anti-friction roller 137 of the clevis will shift to a position against the stop lug 134 of the arm 121, as shown in the pneumatic control device 120 in Figure 2. Such action will permit the piston 124 to be quickly moved forwardly to the limit of its movement, thereby closing the gate 117 and at the same time opening the switch 128 by a snap-action. As soon as the overload on the feeder 94 has been relieved, the piston 124 of the control device 120 will return to its normal position by the action of the spring 138, and at the same time the switch 128 will close and thereby cut out the resistance momentarily introduced in the motor circuit during the period the feeder 94 was overloaded. The feeder then resumes its normal feeding operation.

Another important feature of the invention resides in the combined electric and manual control provided for simplifying the operation of the apparatus and whereby the traveling movement of the horizontal conveyer in either direction will be automatically interrupted, whenever the conveyer reaches the limit of its travel in either direction.

To thus control the up and down travel of the horizontal conveyer 14, suitable limit switches, generally designated by the numerals 143 and 144 are interconnected in the control circuit. These switches may be located on one of the side walls of the container, or on some other suitable support, and may be actuated by a pin 145 carried by one of the bearings supporting the shaft 24, as indicated in Figure 2. The switches 143 and 144 are of well known construction, and therefore need not be described in detail.

Figure 6:
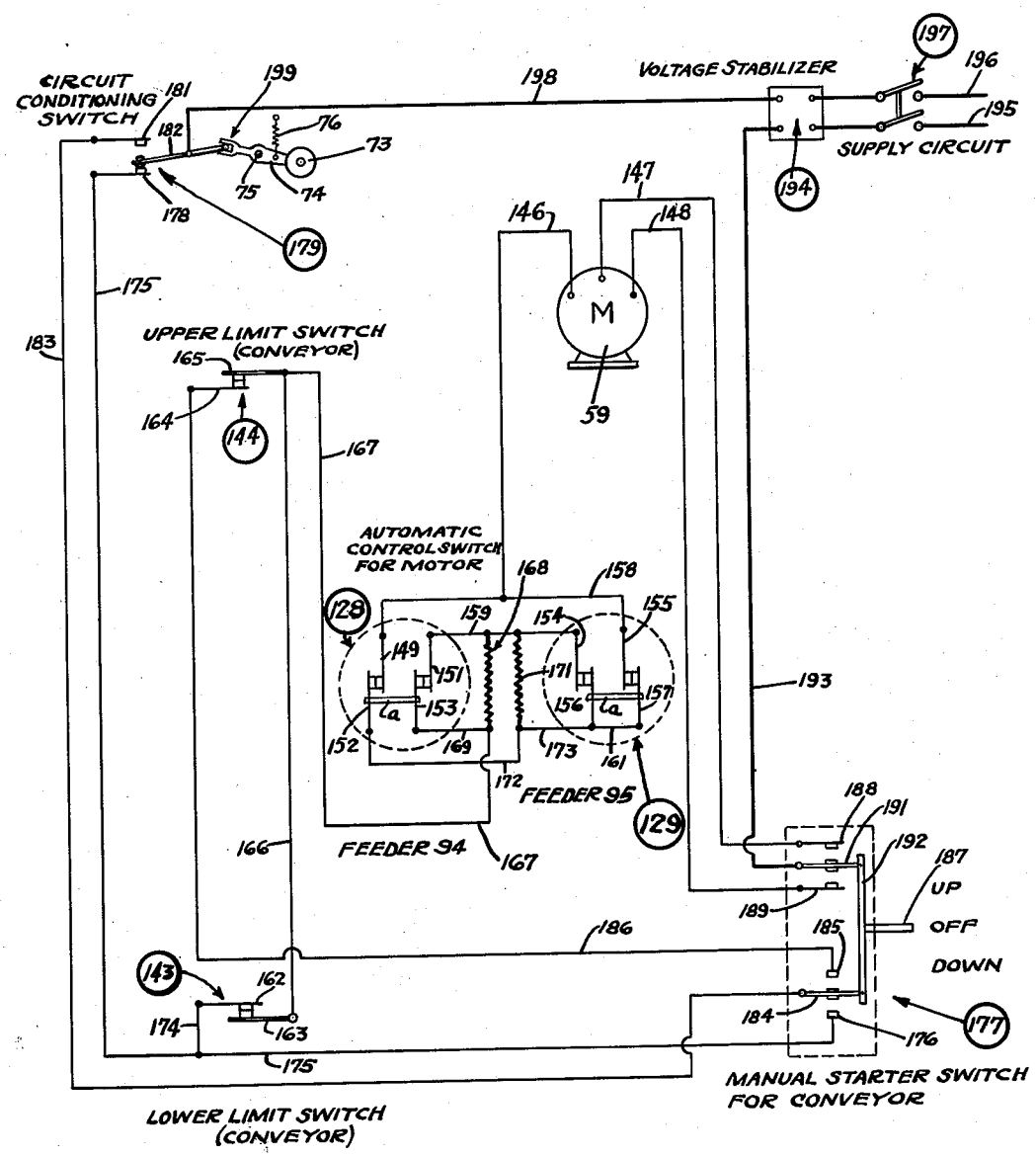
Figure 6 is a wiring diagram schematically illustrating the various electric control devices for automatically controlling the operation of the apparatus.

In Figure 6 there is illustrated a wiring diagram showing the electrical connections between the various control elements. The conveyer drive motor 59 for the horizontal conveyer 14 is shown provided with three wires, 146, 147, and 148. In the wiring diagram the feeder control switch 128 is shown provided with dual fixed contacts 149 and 151, normally electrically engaged with complemental movable contacts 152 and 153. The control switch 129 of feeder 95 is shown provided with similar dual fixed contacts 154 and 155 which normally are engaged with complemental movable contacts 156 and 157, respectively. The movable contacts 152 and 153 of the control switch 128 of feeder 94 are tied together for simultaneous operation by a connection a, and the corresponding contacts 156 and 157 of switch 129 are tied together by a similar connection a. A wire 158 connects together the contacts 149 and 155 of the control switches 128 and 129. The wire 146 leading from the motor 59 is shown connected to the cross wire 158.

Contacts 151 and 154 of the control switches 128 and 129, respectively, are connected together by a wire 159, and a wire 161 connects together the contacts 156 and 157 of the control switch 129. The lower limit switch 143 of the conveyer 14 is shown comprising a fixed contact 162 and a movable contact 163, and the upper limit switch 144 is shown comprising a fixed contact 164 and a movable contact 165. The movable contacts 163 and 165 of the two limit switches are electrically connected together by a wire 166 and a second wire 167 leads from the movable contact 165 of the upper limit switch 144 to one end of a suitable resistor, generally designated by the numeral 168. The opposite end of resistor 168 is connected to the wire 159 and a wire 169 is shown connecting the resistor 168 and wire 167 to the contact 153 of the control switch 128.

A similar resistor 171 is shown having one end electrically connected to the wire 159 and its opposite end to a wire 172 which electrically connects the resistor 171 to the contact 152 of control switch 128. A wire 173 also connects the resistor 171 to the contact 156 of control switch 129. The fixed contact 162 of the lower limit switch 143 has a connection 174 with a wire 175, one end of which is shown connected to a contact 176 of a manually operable control switch, generally designated by the numeral 177. The opposite end of the wire 175 is shown connected to a fixed contact 178 of a suitable circuit conditioning switch, generally designated by the numeral 179. The switch 179 also comprises a fixed contact 181 and a movable contact 182, the movable contact being alternately engageable with the contacts 178 and 181 depending upon the position of the horizontal conveyer in its travel. The contact 181 of the control switch 179 has a wire 183 connecting it to a movable contact 184 of the manually operable switch 177. The second fixed contact 185 of the switch 177 has a wire 186 connecting it to the fixed contact 164 of the upper limit switch 144.

To control the up and down travel of the horizontal conveyer 14, it is necessary to reverse the flow of current to the motor when the horizontal conveyer reaches the limit of its travel in either direction. To accomplish this, a suitable motor-reversing switch is incorporated in the manual control switch 177, and is simultaneously operable by manipulation of the control lever 187 to automatically reverse the flow of current to the motor, depending upon the position of the control lever 187 of the control switch 177.

The motor-reversing switch may be any well known type suitable for the purpose, and is shown comprising fixed contacts 188 and 189 and a movable contact 191 which may be operatively connected to an operating bar or member 192 to which the movable contact 184 of the switch 177 is also shown connected, as best illustrated in Figure 6.

The wire 147 of the motor is connected to the fixed contact 188 of the motor reversing switch, and the wire 148 of the motor is connected to the other fixed contact 189 of said switch. The movable contact 191 has a wire 193 connecting it to one side of a voltage stabilizer, generally designated by the numeral 194, the other side of which is adapted for connection to a suitable source of electric current by suitable wires 195 and 196. A suitable cut-out switch 197 may be interposed in the wires 195 and 196 to shut off the supply of current to the apparatus when desired. A second wire 198 connects the voltage stabilizer with the movable contact 182 of the control switch 179, as shown in Figure 6.

By referring to Figures 2 and 6 it will be noted that the pivoted arm 74 which carries the pulley 73 of the belt 67 has an operative connection with the movable contact 182 of the circuit conditioning switch 179, as shown at 199 in Figure 6, whereby the movable contact 182 may be moved from one position to another between the two contacts 178 and 181 by swinging movement of the arm 74.

*Operation*

In the operation of the novel apparatus herein disclosed, the horizontal conveyer 14 is elevated to the dotted and full line positions indicated at A in Figures 1 and 2, and the lever 88 may then be swung downwardly to the position shown in Figure 1, whereupon the pressure bars 85 are moved forwardly to swing the rear sectional wall 77 into the position shown in Figure 1, thereby closing the gap 89. When the conveyer is in position A, a filler hose 43 may be inserted into the container or interior of the truck body below the horizontal conveyer 14, the filler hose being inserted between the uppermost fixed plate 83 of the telescoping wall sections of the rear wall 77 of the truck body and the conveyer 14, as indicated by dotted lines 43 in Figure 1. It is to be understood that adequate space is provided between the uppermost edge of the telescoping plate 83 and slats or cross bars 26 of the conveyer to readily permit a filler hose to be inserted therebetween for filling the truck.

After the container or truck body has been filled to capacity, which may readily and conveniently be accomplished by blowing the material into the truck body from the conduit 43, whose intake end is connected to a suitable suction device for drawing the granular insulating material from a suitable storage bin or box car and delivering it into the truck by air pressure, the loaded truck is driven to the job or building to be supplied with insulation, and the feeders may then be set into motion by starting the engine 106 which will immediately force a blast of air through the service lines or hoses 115 and 116 in the usual manner. Immediately following the starting of the feeders 94 and 95, the operator may shift the lever 88 into the position shown in Figure 3, whereby the pressure against the telescoping wall sections or plates by the rock wool is released so that the plate sections 78 may readily telescope, as the elevator descends during the unloading of the contents from the truck body or container into the chute 91 provided at the rear end of the truck.

To start the horizontal elevator 14, the operator shifts the control lever 187 of the manual starting switch into its "Down" position, whereupon current will flow from the wire 196 of the supply circuit through the voltage stabilizer 194 and wire 198 to the movable contact 182 of the circuit conditioning switch 179. The movable contact 182 being in electrical engagement with the fixed contact 178, will direct the current through the wires 175 and 174, contacts 162 and 163 of the lower limit switch 143, and thence through the wires 166, 167 and 169, contacts 153 and 151, wire 159, contacts 154 and 156, wire 161, contacts 157 and 155, thence through wires 158 and 146 to the motor 59.

From the motor 59 the current will flow through the wire 148 to the fixed contact 189 of the motor reverse switch, thence through the movable contact 191 of said switch and through the wire 193 back to the voltage stabilizer, thereby completing the circuit to the motor 59 and causing the latter to start and thereby drive the belt 67 and conveyer 14, as will be understood by reference to Figures 2 and 4. The downward travel of the conveyor 14 is controlled by the speed of the motor 59 through the speed reducer 49, and is so regulated that it will feed the insulating material from the container over the top edge of the uppermost telescoping wall member 83 and into the chute 91 across the entire width of the container.

It will be noted by reference to Figure 5 that the cross members or slats 26 of the conveyer 14 have their ends extending outwardly beyond the frame members 22 and 23, and the edges of said cross members are serrated or provided with saw teeth as shown at 28, whereby said cross members may readily pick up or scrape the rock wool off the top of the body of wool contained in the truck body and discharge it into the chute 91 as will readily be understood by reference to Figures 1 and 3. By thus "scraping" the material off the top of the load, the material is delivered into the chute 91 in a loose, fluffy state, and from whence it is blown into the wall spaces. This is a highly desirable feature as it assures the operator that the rock wool, when deposited in the wall spaces, will have a maximum number of air cells therein, highly essential to obtain maximum insulating qualities. In addition when the insulating material is blown into the wall spaces in such a highly aerated condition, less material is required to fill a given space, with a resultant reduction in the cost of each job.

The insulating material is precipitated into the bottom of the chute 91 by the conveyer 14 where it is engaged by the spiral conveyer 71 and conveyed inwardly to the discharge spout 93, from whence it flows into the supply legs 98 and 99 of the feeders 94 and 95, respectively, as will be understood.

In the normal operation of the apparatus and during the unloading of the insulating material from the truck body, the manual starter switch 177 will remain in its "Down" position to retain the motor circuit in closed or motor-operating condition, as hereinbefore described. As the conveyer approaches the limit of its downward movement, the pin 145 will engage the movable contact of the lower limit switch 143 and thereby actuate said switch and break the circuit to the wire 166, whereupon the supply of current to the motor is partially cut off. The motor 59 will then come to rest and therefore the conveyer 14 and its driving mechanism. The feeders 94 and 95, however, continue to operate until the engine 106 is shut off, as the engine preferably operates independently of the conveyer drive motor 59.

When the container or truck body has been emptied of its contents, as above described, the horizontal elevator 14 must be elevated to the dotted line position A, shown in Figure 1, before the truck body or container can again be loaded. To expedite the operation of elevating the conveyer 14, means is provided whereby said conveyer may be quickly elevated from its lowermost position shown in dotted lines in Figure 2, to its uppermost position A, assumed when loading the truck. To thus quickly elevate the conveyer from its lower to its upper position, the belt 56, shown in Figure 4, is rendered inoperative, which may readily be accomplished by removing the belt 56 from its pulleys 53 and 58, or by releasing the pulley 58 from the shaft 54, and then rendering the belt 55 operable to drive the speed reducer.

In other words, by referring to Figure 4, it will be noted that two belt drives are shown between the countershaft 54 and the shaft 51 of the speed reducer. The belt drive 55 serves to drive the speed reducer at a relatively higher speed, as when elevating the conveyer 14, and the belt drive 56 serves to drive the speed reducer at a relatively lower speed, as when gradually moving the conveyer downwardly in the operation of unloading the material from the truck body to the feeders 94 and 95. Consequently, the two belt drives 55 and 56 cannot transmit power to the speed reducer at the same time, and, therefore, they are utilized alternately.

When unloading the material from the container or truck body, the downward speed of the horizontal conveyer 14 is relatively slow, and therefore the speed reducer is driven from the power shaft 54 by the belt drive 56, as above stated, the belt 55 being either removed from its pulleys, or if desired, the pulley 57 may be released from the countershaft 54 so that it may idle on said shaft.

On the other hand, when the load has been removed from the truck body and the elevator is to be elevated to its uppermost or loading position, the belt 55 is rendered operative to drive the speed reducer, and the belt 56 is then rendered inoperative by removing it from its pulley, or by releasing the pulley 58 from the shaft 54, in a manner similar to the pulley 57 of the belt 55. Thus, the winding drum 47 is provided with two speeds, one for elevating the conveyer, and a relatively slower speed for lowering the conveyer during the unloading operation.

Before the elevator can be elevated to its uppermost position, the belt 67 must be removed from the idler pulley 73, shown in the upper right-hand corner of Figure 2, to thereby permit the spring 76 to swing the arm 74 upwardly and thereby cause the movable contact 182 of the circuit conditioning switch 179 to be moved into electrical engagement with the fixed contact 181 by the spring 76. This is necessary in order that a circuit may be established to the motor, when the lever 187 of the manual starter switch 177 is moved upwardly into the "Up" position. So long as the elevator is in its lowermost position, the circuit is broken through the contacts of the lower limit switch 143.

It will thus be seen that before the motor can be started to elevate the conveyer to its upper position, the control circuits must be so conditioned that when the manual control lever 187 is shifted to its "Up" position, the circuit to the motor may be completed or closed to operate the motor 59. Such conditioning of the control circuit if effected by the automatic shifting of the movable contact 182 of the circuit conditioning switch 179 into electrical engagement with the fixed contact 181, when the belt 67 is manually removed from the pulley 73 prior to starting the conveyor 14 in its upward travel.

Thus, when the manual starter switch 177 is shifted to its "Up" position shown in Figure 6, the movable contact 184 thereof will bridge the contact 185, and, at the same time, its movable contact 191 will bridge the fixed contact 188. This will cause the current to flow from the wire 198 through the movable contact 182, fixed contact 181, through the wire 183 to the movable contact 184 of the manual control switch 177; thence from the fixed contact 185, wire 186, closed contacts 164 and 165 of the upper limit switch 144, wires 167 and 169, contacts 153 and 151 of the switch 128, wire 159, contacts 154 and 156 of switch 129, wire 161, and through the other contacts 157 and 155 of switch 129; thence through wires 158 and 146 to the motor, and from the motor through the wire 147 to the fixed contact 188 of the motor reversing switch.

Such manipulation of the manual starting switch will start the motor 59 in a direction to elevate the conveyer, and when the conveyer reaches the limit of its upward travel, it will automatically open the upper limit switch 144 and thereby again automatically open the circuit to the motor 59. Before the motor can again be manually started, the belt 67 must be engaged with the pulley 73 to thereby swing the arm 74 downwardly to cause the movable contact 182 of the circuit conditioning switch 179 to bridge the fixed contact 178.

The above describes the normal up and down movement of the conveyer required in the operation of loading and unloading the container or truck body. In the event that an obstruction should occur in one of the service lines or hose 115 or 116, say, for example, service line 115 of feeder 94, than a back pressure will immediately develop in its air supply conduit 111, which will be transmitted to the cylinder 125 by the conduit 126. Such pressure against the piston 124 will actuate the piston rod 123 whereby it may eventually be moved forwardly to the position shown in Figure 2, thereby closing the gate 117 to the leg 98 of the feeder 94. Such closing of the gate 117 will immediately interrupt further supply of insulating material to the feeder 94, whereupon the continued air pressure in the service hose 115 may eventually blow out or clear the obstruction in the hose, whereupon the back pressure in the cylinder 125 is released, allowing the piston 124 to be returned to its normal position by the spring 133, thereby returning the gate 117 to open position and permitting the feeder 94 to resume its normal feeding operation.

During the interval that the gate 117 is closed, the speed of the motor 59 may be reduced to approximately 50 per cent of its normal speed thereby to reduce the speed of the conveyer 14 whereby the delivery of material into the chute 91 is correspondingly decreased. Such automatic reduction in the operation of the motor is effected by the automatic opening of the switch contacts 152 of the switch 128 mounted on the cylinder 125 of the control unit 120 and as shown in the wiring diagram. When the contacts 152 and 153 are moved out of electrical connection with their complemental contacts 149 and 151, the motor circuit is broken through the contacts 153 and 151 and the flow of current must therefore pass through the resistor 168 which adds sufficient resistance in the motor circuit to reduce its speed to approximately 50 per cent of normal. As soon as the back pressure in feeder 94 is released the contacts 152 and 153 are again moved into electrical engagement with their complemental fixed contacts 149 and 151 to thereby by-pass the current around the resistor 168, whereupon the motor will resume its normal speed.

The same applies should an obstruction occur in the service line or hose 116 of feeder 95. Should this happen, the contacts 156 and 157 would automatically be moved out of electrical engagement with their complemental fixed contacts 154 and 155, whereupon the current would pass through the resistor 171 to thereby reduce the speed of the motor.

Should both service lines or hose 115 and 116 simultaneously become clogged or overloaded, the control switches 128 and 129 would be opened to thereby interpose both resistors 168 and 171 in the motor circuit, whereby the operation of the motor might be temporarily completely interrupted, in which condition it will remain until the overload on the feeders is partially or wholly removed.

It will thus be noted that the operation of the novel apparatus herein disclosed is largely automatic in operation. The travel of the horizontal conveyer 14 is automatically interrupted at each end of its travel, and the manual starter switch 177 must be manually operated each time the conveyer is to be moved from one position to the other. The switch 197 provides means whereby the entire supply of current to the apparatus may be cut off, if desired.

In actual practice, it has been found that the wires 195 and 196 may be in the form of a conventional extension cord having a plug at its end whereby the cord may be readily plugged into a conventional electrical socket, where convenient.

When using the novel apparatus herein disclosed, the bulk insulating material is preferably loaded into the truck body or container by inserting a filler hose into the truck body, as indicated in Figure 1. The material may readily be blown into the truck body from a suitable storage pin or box car, which greatly reduces the cost of loading the truck, as compared to the usual method of transporting the material in bags, which necessitates first bagging it and then manually loading the bagged insulating material into a conventional truck and hauling it to the job, after which the bags must be individually hauled to unload them and to dump the contents of each bag into the hopper of a conventional blowing machine or apparatus. All of this additional labor is dispensed with by the employment of my improved apparatus. The material is simply blown into the truck body after which it is hauled to the job where it may then be automatically unloaded from the truck body and delivered to the service lines or hose at the proper rate of feed to prevent overloading the feed lines in the normal course of operation. The apparatus does not require an attendant except to manipulate the service or feed lines at the point of delivery of rock wool into the wall spaces or other places to be supplied.

Conventional blowing machines are usually installed at one end of a truck and a hopper is provided, into which the rock wool is manually delivered by emptying the filled sacks into said hopper. All of this manual labor is entirely dispensed with by the use of this apparatus and in addition the same truck is used for hauling the material from the source of supply to the job. It is also well known that when blowing insulation into walls with a conventional machine, the operator must be alert at all times to be ready to withdraw the blowing nozzle from the wall in the event an obstruction develops in the hose because otherwise the obstruction may become very compact and therefore consume considerable time to clear. With the novel apparatus herein disclosed, as soon as the insulating material begins to accumulate or tends to clog the blowing nozzle, the back pressure which immediately develops in the feeder, will cause the automatic interruption of further delivery of material to the overloaded feeder by reason of the automatic closing of the gates 117 and 118 by the pneumatic control devices 120 and 130, and by reducing the speed of the conveyer drive motor 59 during such momentary overloading of one or both feeders, as hereinbefore disclosed. This in almost all cases means that as soon as an overload develops in one of the feeders, the supply of material is reduced or may be completely cut off, but at the same time the supply of air to the hose line remains uninterrupted, whereupon, and in most all cases, the material which may have commenced to clog the hose, is immediately blown therefrom whereupon the entire apparatus is again restored to normal operation.

As a result of the even feed of the apparatus herein disclosed, the wool blown into wall spaces or into attics may be more uniform than is possible to obtain with conventional hand fed machines. It has also been found that an apparatus as herein disclosed has a much greater capacity than a conventional machine and may be operated by one man as compared to the minimum number of three men now usually necessary to operate a conventional rock wool blowing machine of this general type.

In order that one man may operate two nozzles or hose lines, each hose is provided with a control valve 201, located adjacent to the discharge nozzle 202, as indicated in Figure 1. The control valves 201 are important in that they provide an effective means of controlling the operation of the entire apparatus by a workman standing upon a ladder or scaffolding or in some place remote from the machine. It should be understood that the speed of the conveyer 14 is such that the rate of discharge from the load into the chute 91 is such that under normal operating conditions the feeders 94 and 95 readily handle the material supplied thereto from the conveyer. Clogging or overloading of the service lines 115 and 116 therefore seldom occurs because the rock wool is delivered to the feeders in a highly fluffy and aerated condition, and at a uniform rate of flow, whereby there is little or no danger of the feeding of the material from the truck body to the feeders being likely to cause overloading of the feeders. Overloading, however, may be caused as a result of wall spaces filling up whereby the material may momentarily partially or completely close the discharge end of a nozzle, in which case a back pressure immediately develops in its respective feeder, thereby causing an automatic reduction in the flow of material to the overloaded feeder because of actuation of its control switch 128, as hereinbefore described.

As hereinbefore stated, when conditions are such that a single operator may manipulate two hose service lines, a single operator may quickly unload the material from the truck body or apparatus and deliver it into wall spaces or other places to be supplied in a comparatively short period of time. The apparatus does not require an attendant as its operation is automatically controlled entirely by the flow of material through the nozzles 202. If at any time, the material tends to close one of the nozzles, the automatic controls are set into motion, and, in like manner, should the operator desire to reduce the flow of material to one or both of the nozzles 202, he may readily do so by simply partially or completely closing the valves 201 adjacent to the nozzles 202. If the two valves are completely closed, the entire machine will come to rest with the exception of the air supply means to the feeders 94 and 95, such as the air pump 107, which will continue to function as it is not dependent upon the motor 59 for its operation. The air supply tank 108, however, is provided with an overload release valve 109 whereby when the discharge of air from the feeders to the service hose is interrupted, the excess air will be released to the atmosphere through the safety valve 109 of the air supply tank.

In the accompanying drawings and specification, the invention has been shown and described in the form of a practical embodiment in a conventional truck chassis. Numerous changes obviously may be made in the various mechanisms employed as, for example, instead of the electrically operated limit switches 143 and 144, mechanical devices might be employed for operating a form of clutch mechanism for transmitting power from the speed reducer to the winding drum 47. In some cases it may also be found advisable to drive the speed reducer from the engine 106 or from the usual power take off shaft of the truck, not shown. V-belts might also be utilized in lieu of the chains 15 and 16 which support the slats 26 of the conveyer 14, and obviously the arrangement of the lifting cables 28, 29, 32 and 33 which support the conveyer 14 within the truck body may be conceivably varied without departing from the scope of the invention.

Another important feature in the construction of this novel apparatus resides in the fact that the insulating material is confined within a closed chamber from the time it is loaded into the truck body at the source of supply, until it is projected or blown into the wall spaces or other places to be insulated. This is highly desirable because mineral or rock wool when handled as in this apparatus, that is, by scraping or dragging it from the top of the load and discharging or dumping it into the chute 91, the finer dust-like particles of the rock wool have a tendency to rise and settle on surrounding surfaces if permitted to escape from the apparatus. By the employment of this apparatus the job of blowing the insulating material into the wall spaces may be accomplished substantially without dust which obviously makes the job a much cleaner one and it does not tend to jeopardize the health of the operators.

In conventional apparatus of this general type where the rock wool is dumped from bags into a hopper, there is a great deal of dust, a portion of which is obviously inhaled by the operators and then, too, it settles on surrounding objects which can be very undesirable.

It will be apparent to those skilled in the art that I have accomplished at least the principal objects of my invention, and it will also be apparent to those skilled in the art that the embodiments herein described may be variously changed and modified without departing from the spirit of the invention, and that the invention is capable of uses and has advantages not herein specifically described; hence it will be appreciated that the herein disclosed embodiments are illustrative only, and that my invention is not limited thereto.

I claim as my invention:

1. In combination with an automotive truck, a body mounted thereon and providing a closed container for receiving bulk granular insulating material, the rear wall of said container comprising a plurality of horizontally disposed telescoping wall sections whereby said wall is collapsible in a downward direction, a horizontal conveyer mounted within the truck body and having means for supporting it therein, and means for vertically translating the conveyer, the uppermost section of said rear wall being operatively connected to the conveyer whereby when the conveyer ascends to its uppermost position adjacent to the top wall of the truck body, the rear telescopic wall of the truck body is extended to provide an imperforate rear wall extending from the conveyer to the floor of the truck body, the upper edge of said wall being spaced from the conveyer to provide an elongated opening through which the truck body may be loaded or unloaded.

2. In combination with an automotive truck body defining a substantially closed chamber, the rear wall of said chamber being collapsible in a vertical direction, a conveyer mounted for vertical traveling movement in said chamber and being sized to overlie substantially the entire area of the top of the load in said chamber, means for supporting the conveyer adjacent to the top wall of the truck body when loading the truck, means for operating the conveyer, means for gradually lowering the conveyer into direct engagement with the top of the mass of material within the truck body whereby the material is unloaded from the truck from the top of the load across the full width of the load, said rear wall gradually collapsing from its upper end in a downward direction as the conveyer moves downwardly, whereby the upper edge of said wall is always so disposed relative to the conveyer that the material is discharged from the truck body over the top of said rear wall, and an auxiliary drive whereby the conveyer may be returned to its uppermost position at a relatively higher rate of travel than when moving downwardly.

3. In combination with a substantially closed chamber, a horizontally disposed conveyer in said container mounted for vertical traveling movement therein, the size of said conveyer being substantially equal to the floor area of the container, means for supporting the conveyer adjacent to the top wall of the container when loading the container, means for driving the conveyer, means for gradually lowering the container into direct contact with the top of the mass of material within the container whereby the material is unloaded from the container from the top of the load across the full width of the load, and means for automatically interrupting the operation of the conveyer each time it reaches the limit of its traveling movement in either direction.

4. In combination with a substantially closed chamber, a horizontal conveyer mounted for vertical traveling movement in said body, a power device, a transmission for transmitting power from the power device to the conveyer and whereby the conveyer may be operated and simultaneously moved downwardly into unloading engagement with the bulk material in said body, stop means associated with the power device and operable by the conveyer for automatically interrupting the operation of the power device, when the conveyer reaches the limit of its traveling movement in either direction and whereby the conveyer also is rendered inoperative, and manually operable means for controlling the operation of the power device and the up and down travel of the conveyer.

5. In combination with a closed truck body, a horizontal conveyer, means for supporting the conveyer for vertical traveling movement in said body, a power device, a drive for transmitting power from said power device to the conveyer and whereby the conveyer may be operated and simultaneously moved downwardly into unloading engagement with the bulk material in said body, stop means associated with the power device and operable by the conveyer for automatically interrupting the operation of the power device when the conveyer reaches the limit of its traveling movement in either direction and whereby the conveyer is rendered inoperative, and an auxiliary drive for transmitting power from the power device to the conveyer supporting means and whereby the conveyer may be returned to its uppermost position at a relatively higher rate of travel than when moving downwardly.

6. In combination with an automotive vehicle comprising a substantially closed body adapted to receive a load of granular insulating material such as rock wool, a conveyer mounted within said body, the size of said conveyer being substantially equal to the effective floor area of the body, means for elevating the conveyer within said body, means whereby the conveyer may be temporarily retained in its uppermost position to permit loading the body, a power device, a transmission having driving connections with the power device and conveyer for operating and vertically translating the conveyer, means for controlling the up and down travel of the conveyer and for causing the conveyer to come to rest at each end of its travel, a plurality of feeders for blowing insulating material into wall spaces and other places, and means for conducting the insulating material from the discharge end of the vehicle body to the feeders in a uniformly controlled flow.

7. In an apparatus for handling bulk granular insulating material such as rock wool, a portable body whose walls define an enlarged substantially closed chamber, a conveyer mounted within said chamber, the size of said conveyer being substantially equal to the effective floor area of the chamber, a vertically movable horizontal conveyer within said chamber, power means for vertically translating the conveyer in said chamber and whereby the conveyor may be temporarily supporting the conveyer in its uppermost position to permit loading the chamber, means for controlling the up and down travel of the conveyer and for causing the conveyer to come to rest at each end of its travel, a plurality of feeders for blowing insulating material into wall spaces and other places, means for conducting the insulating material from the discharge end of the chamber to the feeders, and means mounted on said feeders and operatively associated with the power means for automatically reducing or interrupting operation of the power means in the event one or more of said feeders become overloaded, said control means automatically being rendered inoperative to retard operation of the power means when the overload is released.

8. In combination with a closed truck body, a horizontally disposed conveyer mounted therein and vertically movable within said body, a chute into which the material is discharged from the truck body by the conveyer, feeders in communication with the chute and adapted to receive insulating material therefrom, means for supplying air pressure to the feeders to conduct the insulating material therefrom through the usual feeder hose lines by air pressure, an electric motor for operating the conveyer and for vertically translating it within said body, control devices on the feeders for partially or wholly interrupting the operation of the motor in the event one or more of the feeders temporarily become overloaded, said control means being actuated by back pressure in the feeders whereby when the back pressure is released from said feeders, the control devices when restored to normal operation will automatically effect normal operation of the motor and conveyer.

9. In combination with a closed truck body, a horizontally disposed conveyer mounted therein and vertically movable within said body, a chute into which the material is discharged from the truck body by the conveyer, the rear wall of the truck body being composed of a plurality of interconnected telescoping sections which are operable by vertical movement of the conveyer to vary the height of said wall in accordance to the height of the conveyer within the truck body, and whereby the top of said rear wall will remain in fixed relation to the conveyer and whereby the insulating material contained in said body may be discharged over the top of said rear wall by the conveyer, feeders in communication with the chute and adapted to receive insulating material therefrom, means for supplying air pressure to the feeders to conduct the insulating material therefrom through the usual feeder hose lines by air pressure, an electric motor for operating the conveyer and for vertically translating it within said body, control devices on the feeders for partially or wholly interrupting the operation of the motor in the event one or more of the feeders temporarily become overloaded, said control means being actuated by back pressure in the feeders whereby when the back pressure is released from said feeders, the control devices when restored to normal operation will automatically effect normal operation of the motor and conveyer.

10. In a mobile apparatus for handling bulk material such as granular rock or mineral wool, a body defining a closed chamber, a horizontally disposed conveyer mounted for vertical traveling movement in said chamber, said chamber comprising a rear wall having its upper edge portion supported in fixed relation to the conveyer and spaced slightly downwardly therefrom to permit the insulating material in said chamber to be discharged therefrom over the top of said rear wall by the conveyer, and said rear wall being composed of a plurality of interconnected horizontal wall sections whereby said wall may collapse vertically, and its top edge move downwardly simultaneously with the conveyer, to maintain a space between the top of said rear wall and the conveyer through which the chamber may be filled or unloaded.

11. In a mobile apparatus for handling bulk material such as granular rock or mineral wool, a body defining a closed chamber, a horizontally disposed conveyer mounted for vertical traveling movement in said chamber, the size of said conveyer being substantially equal to the effective area of the floor of said chamber, said chamber having a vertically collapsible rear wall, the upper edge portion of which is supported in fixed relation to the conveyer and spaced slightly downwardly therefrom to permit the insulating material in said chamber to be discharged therefrom over the top of said rear wall by the conveyer, the spacing between the top of said rear wall and the conveyer also permitting the chamber to be loaded with a fresh supply of insulating material, when the conveyer is in an upper position, a power device for driving the conveyer and whereby the conveyer may be vertically translated in said chamber, and means adjacent to said rear wall for receiving the insulating material discharged from the chamber by the conveyer and delivering it to a suitable apparatus for blowing the insulating material into a wall or other receiving means.

HARRY C. CHAMBERLIN.

REFERENCES CITED

The following references are of record in the file of this patent:

UNITED STATES PATENTS

| Number | Name | Date |
| --- | --- | --- |
| 892,593 | Keller | July 7, 1908 |
| 1,141,113 | Gambee | June 1, 1915 |
| 1,263,035 | Casler | Apr. 16, 1918 |
| 1,450,903 | Newhouse | Apr. 3, 1923 |
| 1,479,990 | Keys | Jan. 8, 1924 |
| 1,570,360 | Lippoldt | Jan. 19, 1926 |
| 1,778,393 | Klugh | Oct. 14, 1930 |
| 2,052,169 | Darden | Aug. 25, 1936 |
| 2,131,305 | Shaw | Sept. 27, 1938 |
| 2,311,773 | Patterson | Feb. 23, 1943 |